United States Patent
Dryer et al.

(10) Patent No.: US 8,956,450 B2
(45) Date of Patent: Feb. 17, 2015

(54) FORMULATION FOR SILICON-DOPED INK USED TO PREVENT CHIP ETCHING

(75) Inventors: Paul William Dryer, Lexington, KY (US); Yimin Guan, Lexington, KY (US); Eunki Hong, Lexington, KY (US); Christopher John Money, Lexington, KY (US); Jose Paul Sacoto Aguilar, Lexington, KY (US)

(73) Assignee: Funai Electric Co., Ltd. (JP)

( * ) Notice: Subject to any disclaimer, the term of this patent is extended or adjusted under 35 U.S.C. 154(b) by 0 days.

(21) Appl. No.: 13/468,470

(22) Filed: Jul. 25, 2012

(65) Prior Publication Data

US 2014/0026783 A1  Jan. 30, 2014

(51) Int. Cl.
*C09D 11/02* (2014.01)

(52) U.S. Cl.
USPC .................................. 106/31.27; 106/31.6

(58) Field of Classification Search
USPC .............................. 106/31.27, 31.6
See application file for complete search history.

(56) References Cited

U.S. PATENT DOCUMENTS

| | | | |
|---|---|---|---|
| 5,221,332 A * | 6/1993 | Kohlmeier | 106/31.33 |
| 5,948,512 A * | 9/1999 | Kubota et al. | 428/195.1 |
| 6,193,792 B1 * | 2/2001 | Fague | 106/31.65 |
| 6,225,370 B1 | 5/2001 | Suthar | |
| 6,638,350 B2 | 10/2003 | Butler | |
| 6,652,634 B1 | 11/2003 | Akers, Jr. | |
| 6,843,838 B2 | 1/2005 | Zimmer | |
| 7,001,936 B2 | 2/2006 | Akers, Jr. | |
| 7,066,991 B2 | 6/2006 | Blease | |
| 7,429,293 B2 | 9/2008 | Cai | |
| 8,188,158 B2 | 5/2012 | Bertelsen | |
| 2002/0126189 A1 | 9/2002 | Gloster | |
| 2004/0048745 A1 | 3/2004 | Kitamura | |
| 2005/0187312 A1 | 8/2005 | Akers, Jr. | |
| 2005/0233097 A1 * | 10/2005 | Tojo et al. | 428/32.26 |
| 2007/0043144 A1 | 2/2007 | House | |
| 2007/0078199 A1 | 4/2007 | Winkler | |
| 2009/0068417 A1 | 3/2009 | Saito | |
| 2010/0285219 A1 | 11/2010 | Cai | |
| 2011/0069114 A1 | 3/2011 | Ikoshi | |
| 2011/0069118 A1 * | 3/2011 | Ohzeki et al. | 347/44 |
| 2011/0234688 A1 * | 9/2011 | Ikoshi | 347/21 |

FOREIGN PATENT DOCUMENTS

| | | |
|---|---|---|
| EP | 2298555 A2 | 3/2011 |
| EP | 2366744 A1 | 9/2011 |
| EP | 2366746 A1 | 9/2011 |

OTHER PUBLICATIONS

Buzzle.com, Properties of Silicon Dioxide, http://www.buzzle.com/articles/properties-of-silicon-dioxide.html (last visited Sep. 20, 2013).
International Search Report of PCT/IB2013/002124 dated Feb. 17, 2014.
Written Opinion of PCT/IB2013/002124 dated Feb. 17, 2014.

* cited by examiner

*Primary Examiner* — Veronica F Faison
(74) *Attorney, Agent, or Firm* — Amster, Rothstein, Ebenstein LLP

(57) ABSTRACT

An ink composition for used in an inkjet printer is provided. The ink composition includes a carrier medium, a colorant, and a silicon doping agent. The silicon doping agent may include silicic acid, silicon dioxide, or silicates. This silicon-doped ink reduces and prevents the etching of the silicon based components of the printhead. Silicon-doped inks protect the printhead from damage, thus improving printhead reliability and increasing printhead service life.

8 Claims, 4 Drawing Sheets

FORMULATION FOR SILICON-DOPED INK USED TO PREVENT CHIP ETCHING

CROSS REFERENCES TO RELATED APPLICATIONS

None.

STATEMENT REGARDING FEDERALLY SPONSORED RESEARCH OR DEVELOPMENT

None.

REFERENCE TO SEQUENTIAL LISTING, ETC.

None.

BACKGROUND

1. Field of the Disclosure

The present disclosure generally relates to imaging, and more specifically, to an ink composition which prevents etching of a printhead component.

2. Description of the Related Art

A robust and high printing capacity printhead is desirable for an inkjet printer. However, an ink, such as for example a pigment based ink, tends to etch silicon based components of the printhead upon contact over time. These silicon based components may include a silicon dioxide protective overcoat and a silicon substrate of a heater chip. Significant etching of these silicon based components may eventually result in delamination of photoimageable nozzle plate, failure of heater chips, or corrosion of electrical interconnection of a heater chip circuit of the printhead, thereby decreasing the service life of the printhead.

To prevent the etching of the chip, a protective overcoat or a more corrosion-resistive thin film may be applied over the heater chip. However, these protective solutions may be difficult to apply during the manufacturing process and may impede the performance of the heater chip. Hence, a better and more permanent solution is needed. The inventors have discovered that by treating the ink with a silicon doping agent, the etching of the printhead component can be reduced or eliminated.

Thus, there is a need to provide an ink composition which prevents the etching of the silicon based components of the printhead to improve printhead reliability and ensure longer printhead service life.

SUMMARY

The present disclosure provides an ink composition for used in an inkjet printer to prevent etching of silicon based components of a printhead. The ink composition includes a carrier medium, a colorant, and a silicon doping agent. The silicon doping agent may include be selected from the group including silicic acid, silicon dioxide, or silicates. The most preferred silicon doping agent is silicic acid.

This silicon-doped ink reduces and prevents the etching of the silicon based components of the printhead. Silicon-doped inks may protect the printhead from damage, thus improving printhead reliability and increasing printhead service life.

BRIEF DESCRIPTION OF THE DRAWINGS

The above-mentioned and other features and advantages of the various embodiments of the disclosure, and the manner of attaining them, will become more apparent and will be better understood by reference to the accompanying drawings, wherein.

DETAILED DESCRIPTION

Figure 1:
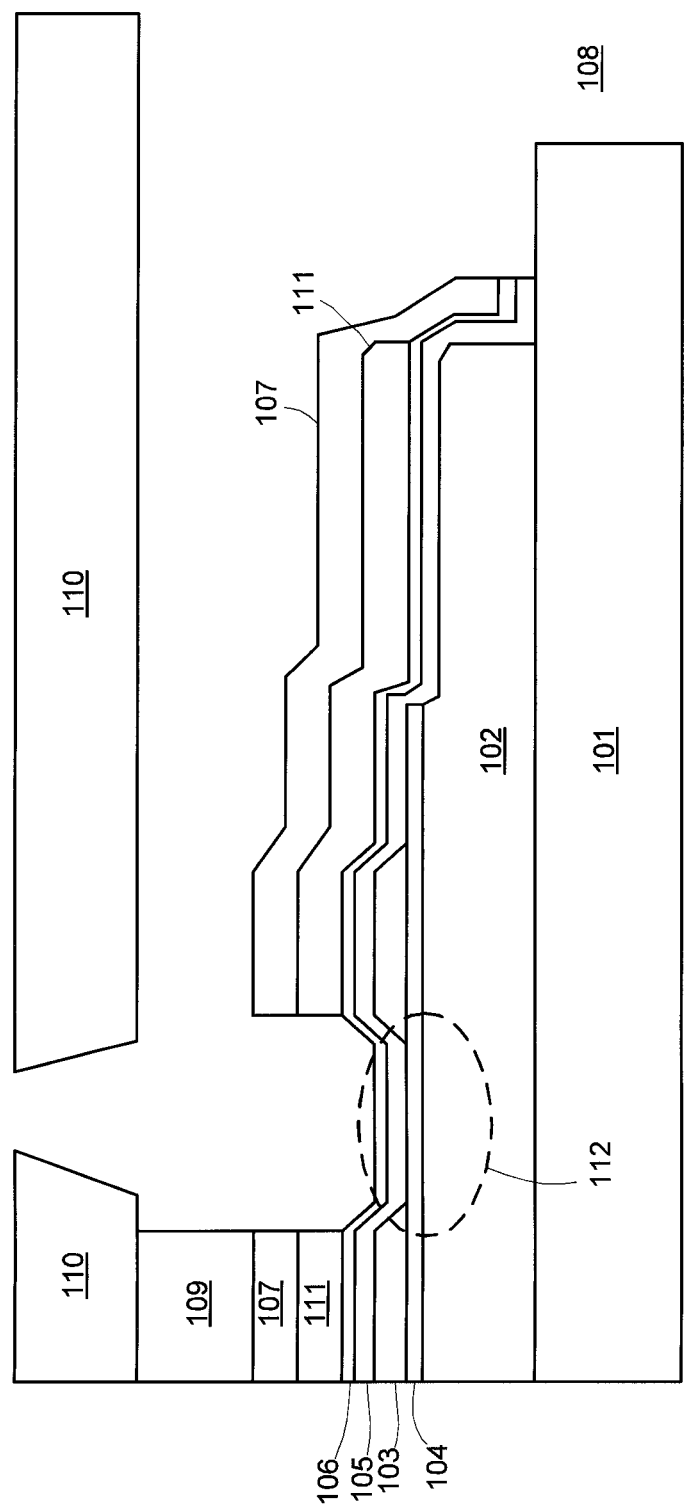
FIG. 1 is a schematic representation of a heater chip of an inkjet printer.

It is to be understood that the disclosure is not limited in its application to the details of construction and the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, the terms "a" and "an" herein do not denote a limitation of quantity, but rather denote the presence of at least one of the referenced item.

Referring to FIG. 1, a cross-sectional view (not to scale) of a portion of a heater chip of an inkjet printer is illustrated. The heater chip generally includes a semiconductor substrate 101, and an insulating layer 102 deposited or grown on the semiconductor substrate 101. An ink via 108 may be etched through the semiconductor substrate 101. A resistive layer 104 may be deposited on a portion of the insulating layer 102. A conductive layer 103 may be deposited on the resistive layer 104 and etched to provide power and ground conductors for a heater resistor 112 defined between the power and ground conductors. A passivation layer 105 may be deposited on the heater resistor 112 and a portion of the conductive layer 103 to protect the heater resistor 112 from fluid corrosion. A cavitation layer 106 may then be deposited on the passivation layer 105 overlying the heater resistor 112. Another insulating dielectric layer 111 may be overlying the conductive layer 103 to provide insulation between upper conductive layers (not shown) and the conductive layer 103. A protective overcoat 107 may then be deposited on top of the insulating dielectric layer 111 to protect a top metallization on the heater chip. Fluidic structures including a flow feature 109 and a nozzle plate 110 are disposed on top of the protective overcoat 107. These fluidic structures may be formed by conventional techniques such as laser ablation or using photoimageable polymers.

The semiconductor substrate 101 may be typically made of silicon and have a thickness ranging from about 100 to about 800 microns or more. The insulating layer 102 may be made of silicon dioxide, phosphosilicate glass (PSG), or borophosphosilicate glass (BPSG). The insulating layer 102 may have a thickness ranging from about 3,000 to about 8,000 Angstroms.

The conductive layer 103 may be selected from conductive metals, including but not limited to gold, aluminum, silver, copper or the like, and have a thickness ranging from about 4,000 to about 15,000 Angstroms. The cavitation layer 106 may be typically made of tantalum (Ta), and have a thickness ranging from about 1,500 to about 8,000 Angstroms.

The passivation layer 105 may be typically made of silicon nitride (SiN) with a thickness ranging from about 1,000 to about 8,000 Angstroms. The insulating dielectric layer 111 may comprise silicon nitride, silicon carbide, silicon dioxide, spin-on-glass (SOG), or the like. The insulating dielectric layer 111 may have a thickness ranging from about 5,000 to about 20,000 Angstroms. The protective overcoat 107 may typically comprise silicon oxide or silicon nitride, and have a thickness ranging from about 5,000 to 10,000 Angstroms.

In a printing operation, an ink is supplied through the ink via 108 and fills in a chamber of the heater chip. If the ink completely etches the protective overcoat 107, the top metallization will be exposed to ink, thus inducing electrical failure of the heater chip. In addition, it will also result in delamination of the fluidic structures, thus degrading drop formation and ejection of ink. To improve reliability of a printhead of the inkjet printer for a longer service life, components of the heater chip should be robust and resistant to ink corrosion or damage.

Figure 2:
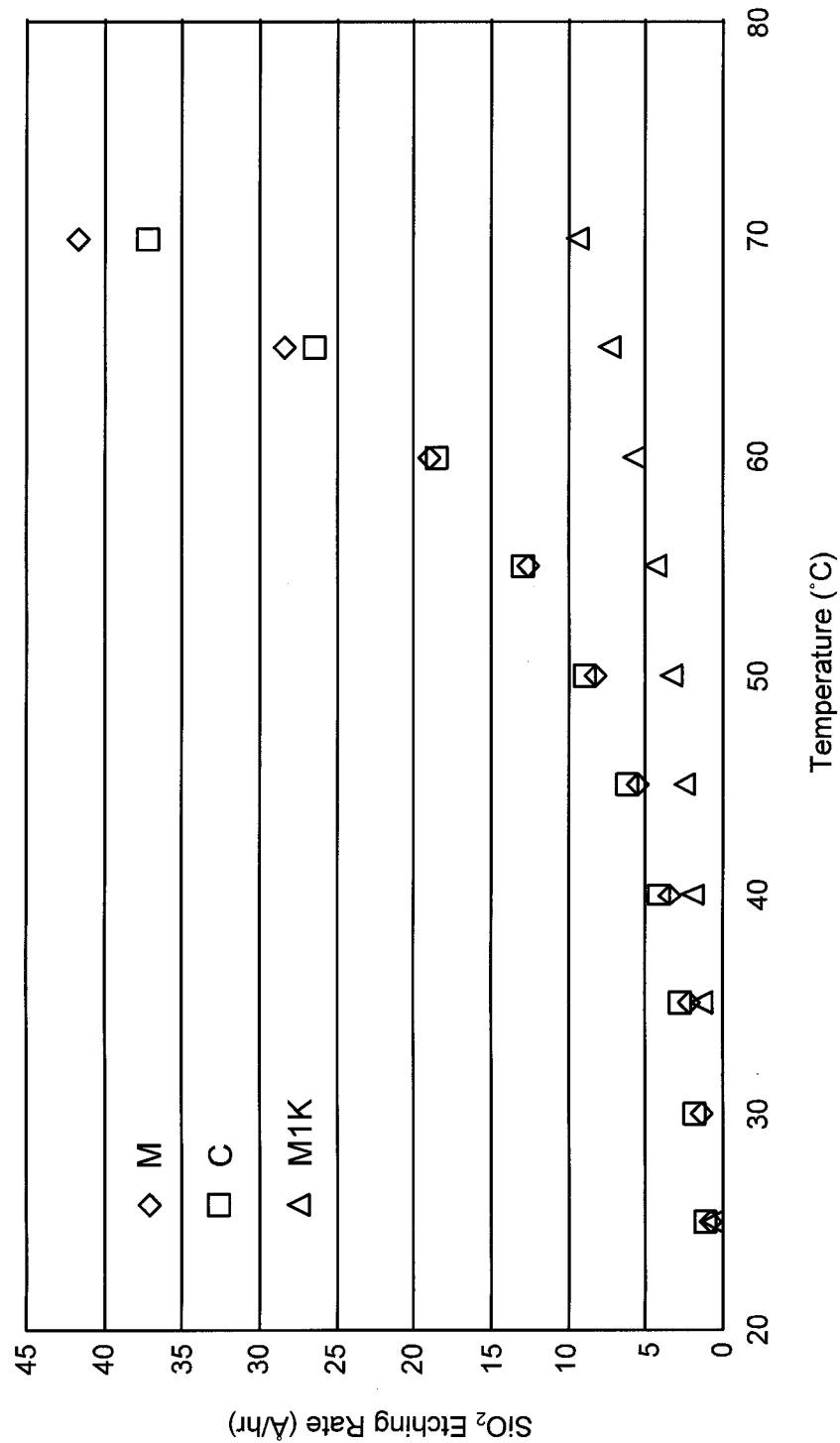
FIG. 2 is a graphical view of etching rates of pigmented inkjet inks on a silicon dioxide material.

An ink soak test conducted on a silicon wafer using a typical pigment based inks, indicates that inkjet inks tend to etch silicon based materials. FIG. 2 shows the etching rate of pigmented cyan (C), magenta (M) and black (M1K) inkjet inks on silicon dioxide material at different temperatures. The silicon dioxide etching rate increases with the increase of temperature. This may indicate that after long period of exposure of silicon based material to ink, the silicon based material may be significantly etched, thus being damaged.

Inkjet inks typically comprise a carrier medium and a colorant. The carrier medium may include water, a water-soluble organic solvent, or combinations thereof. The colorant may be a soluble dye, an insoluble pigment, or combinations thereof.

One or more humectants may be included in the ink including 1,3 propanediol, 1-(2-hydroxyethyl)-2-pyrrolidinone), trimethylolpropane and polyol. A commercially available polyol may be, for example, POLYOL® 3165 from Perstorp Polyols, Inc., located in Toledo, Ohio, USA.

Surfactants may be added to the ink to adjust the surface tension to an appropriate level. The surfactants may be anionic, cationic, amphoteric or nonionic. A particularly useful nonionic surfactant is sold under the trade name SUR-FYNOL® 456 from Air Products, Inc., located in Allentown, Pa., USA.

A polymeric dispersant may be added to the ink. Polymeric additives suitable for use in the present invention include any of the anionic, cationic or nonionic polymers known in the art as suitable for use as polymeric additive in inkjet ink preparations. The amount of the polymeric additive added to the ink formulation must not negatively affect properties of the ink such as viscosity, stability and optical density. The ink composition of the present invention contains a polymeric additive in the amount from about 0.5% to about 2% most preferably about 0.8%, based on the overall total weight of the inkjet ink composition.

The polymeric additive is a graft co-polymer, preferably a ter-polymer made by a free radical polymerization process. It preferably contains three monomers or components: namely a hydrophilic component, a hydrophobic component and a protective colloid component. The ratio of the three monomers can vary. The preferred ratio of the hydrophilic component: the hydrophobic component: the protective colloid component can range from 5:1:1 to 20:1:1, most preferably, 15:1:1. This polymeric additive and its polymerization is more particularly described in U.S. Pat. Nos. 6,652,634 and 6,896,724 assigned to the assignee of this application.

The hydrophilic component of the polymeric additive is preferably an ionic monomer segment which may be selected from acrylic acid, methacrylic acid, crotonic acid, or other acid containing monomers. The hydrophilic segment preferably provides polymeric additive electrostatic stability. Particularly preferred is a methacrylic acid (MAA).

The hydrophobic component of the polymeric additive preferably contains a non-polar functionality. Preferred groups that provide the electron rich functional groups include nonylphenyl, mono-, di-, and tri-styrene phenol, polydimethylsiloxy, and steryl. Examples of such monomers include, but are not limited to, polymerizable monofunctional vinyl monomers from Toagosei Co. of Tokyo, Japan under the trade name Aronix M-117, mono-methacryloxypropyl terminated polydimethylsiloxane from Chisso Corporation of Tokyo, Japan. Non-siloxyl hydrophobic monomers may be derived from long chain aliphatic groups, long chain alcohols, and alkyl aryl alcohols. Examples of such materials preferably include stearyl or methacrylate or nonylphenol acrylate or methacrylate. The most preferred hydrophobic component is polypropylene glycol nonylphenyl ether acrylate sold commercially by Toagosei Co. under the trade name Aronix M-117.

Another important component of the polymeric additive is the protective colloid component. This component provides extra stability to the ter-polymer in an aqueous system. Use of this component substantially reduces the amount of ionic monomer component needed, thereby increasing the non-ionic water solubility of the polymeric additive. Preferred protective colloid segment is poly (ethylene glycol) 2,4,6-tris-(1-phenylethyl) phenyl ether methacrylate (Sipomer SEM-25) and its di and mono derivatives wherein the alkylene group contains from 3 to 10 carbon atoms. This type of monomer is commercially available from Rhodia, USA of Cranbury, N.J. under the trade name SIPOMER/SEM25.

A particularly useful polymeric additive available from Lexmark International®, Inc. is an acrylic terpolymer having moieties of methacrylic acid (MAA); poly (propylene glycol) 2,4,6-tris-(1-phenylethyl) phenyl ether methacrylate (Sipomer SEM-25). In exemplary embodiments, the molar ratio of MAA: Aronix M-117: Sipomer SEM-25 ranges from 4:1:1 to 40:2:1. In the most preferred embodiment, the molar range of the MAA: Aronix M-117: Sipomer SEM-25 is 15:1:1. Alternatively, the ratio of MAA: Aronix M-117: Sipomer SEM-25 is 6.2:1:1. This polymeric additive and it polymerization is more particularly described in U.S. Pat. 6,652,634 and U.S. Pat. No. 6,896,724 assigned to the assignee of the present invention and the disclosures in their entirety are herein incorporated by reference.

Another useful polymer dispersant is a graft polymer having both an anionic hydrophilic monomer and a hydrophobic aromatic monomer. The hydrophilic monomer can be any carboxylic acid containing vinyl, acrylic or methacrylic molecule which is typically used in radical polymerization. Examples are methacrylic acid or acrylic acid. The hydrophobic monomer can be any phenyl containing monomer of the type including acrylic, methacrylic, vinyl or styrene that is typically used in radical polymerization. An exemplary polymeric additive of this type is a copolymer manufactured by Lexmark International®, Inc. using methacrylic acid for the hydrophilic component and benzyl methacrylate for the hydrophobic component. The molar ratio of the methacrylic acid to the benzyl methacrylate is 1:1. Another useful polymeric additive is terpolymer using styrene and alpha-methyl styrene in the hydrophobic component and acrylic acid in the hydrophilic component of the terpolymer. The terpolymer is sold by BASF Company under the trade name Joncryl® HPD 671. Another useful polymeric additive, manufactured by Lexmark International® Inc. is described in U.S. Pat. Nos. 5,714,538 and 5,719,204 assigned to the assignee of this invention.

A biocide may be added to the ink to suppress the growth of microorganisms including molds and fungi. Example biocide may comprise methyl-4-isothiazolin-3-one.A commercially available biocide may be, for example, KORDEX MLX from Rohm and Haas, located in Philadelphia, Pa., USA.

Additional additives may optionally be present in the ink. These may include thickeners, anti-kogation agent, conductivity enhancing agents, drying agents, penetrant, defoamers, anti-corrosion agents, viscosity modifying agents, or dispersant. Example dispersant may include acrylic terpolymer dispersant.

The present disclosure provides an ink composition which includes a silicon doping agent to prevent etching of the silicon based components of the heater chip. The silicon doping agent may include silicic acid, silicon dioxide, or silicates. Example silicic acids may include metasilicic acid ($H_2SiO_3$), orthosilicic acid ($H_4SiO_4$), disilicic acid ($H_2Si_2O_5$), and pyrosilicic acid ($H_6Si_2O_7$). Example silicates may include orthosilicate, pyrosilicate, metasilicate, acid counterparts, or combinations thereof. Further example of silicates may include nesosilicates, sorosilicates, cyclosilicates, inosilicates, and tectosilicates. Silicates may be in various forms including silicate salts of sodium, potassium, calcium, or aluminum.

Figure 3:
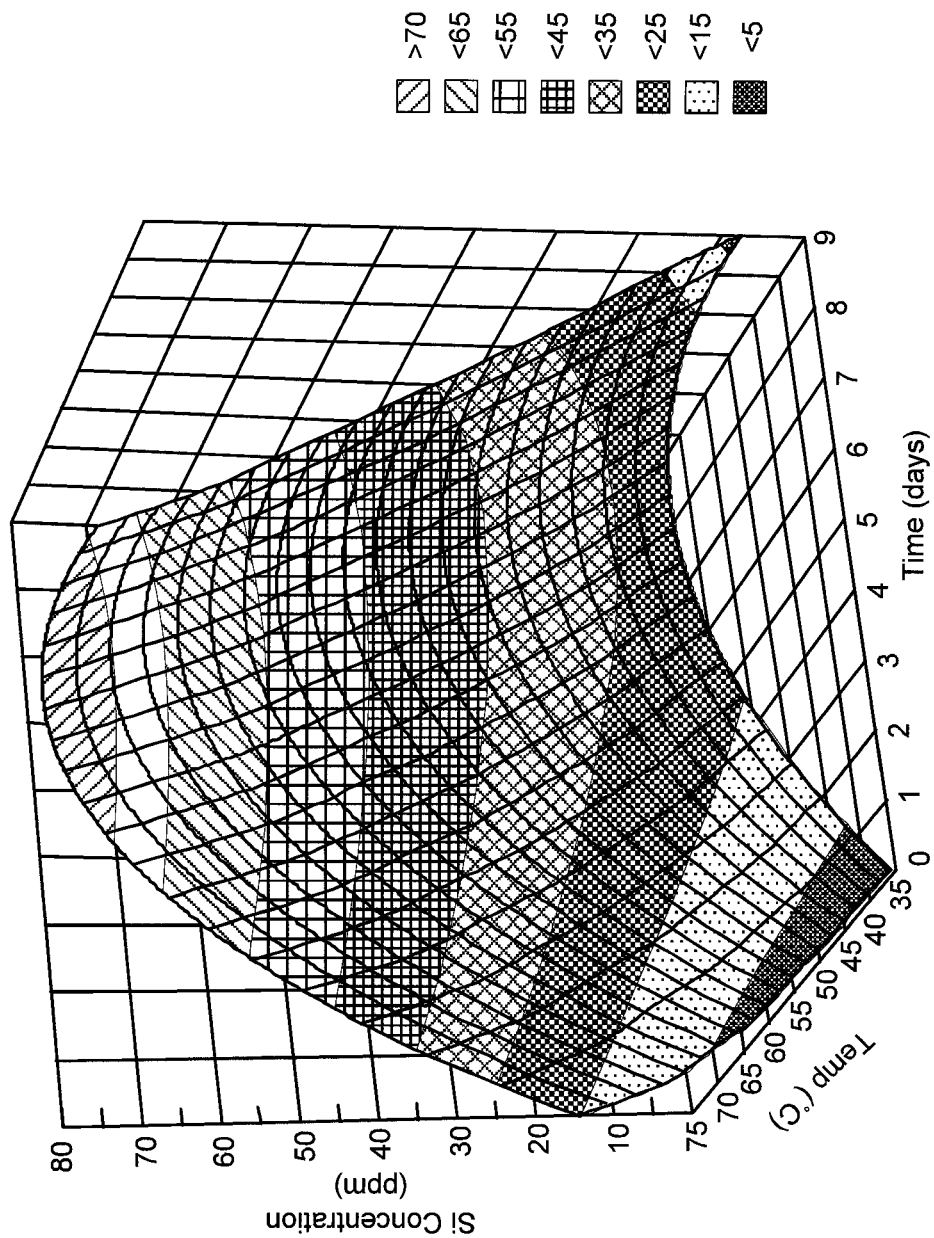
FIG. 3 is a graphical view of a silicon saturation curve of a pigmented magenta ink formulation.

The ink composition may include a silicon doping agent at an amount of at least 30 ppm-silicon. More preferably, the silicon doping agent may be added at an amount saturating the ink composition with silicon. As used herein, the term saturation refers to a point where a maximum amount of a substance is solubilized by a solution at a given temperature. Silicon saturation of the ink composition may be gathered experimentally. FIG. 3 shows an example silicon saturation curve of a pigmented magenta ink formulation. The data presented are the silicon concentration of the ink formulation after soaking with a silicon based material at a given temperature for a period of time. As shown in FIG. 3, the example pigmented magenta ink formulation may be saturated with silicon at a level of about 70 ppm to about 80 ppm. Silicon saturation level of the ink composition may vary depending on the composition of the ink. Silicon doping agent may be added to the ink at amount achieving below or above silicon saturation level as long as the quality and performance of the ink may not be compromised.

Table 1 shows example formulations of the ink composition utilizing different concentration levels of the silicon doping agent according to the present disclosure and a control ink having no silicon doping agent.

TABLE 1

| | | % Composition by Weight FORMULATION | | | | |
|---|---|---|---|---|---|---|
| Components | Material | Ink A | Ink B | Ink C | Ink D | Ink E |
| Silicon Doping Agent | Silicic Acid | 0.00 | 0.05 | 0.20 | 0.50 | 2.00 |
| Colorant | Cyan pigment | 3.00 | 3.00 | 3.00 | 3.00 | 3.00 |
| Dispersant | Acrylic Terpolymer | 0.50 | 0.50 | 0.50 | 0.50 | 0.50 |
| Surfacant | SURFYNOL 456 | 0.75 | 0.75 | 0.75 | 0.75 | 0.75 |
| Biocide | KORDEX MLX | 0.15 | 0.15 | 0.15 | 0.15 | 0.15 |
| Humectants | 1,3-Propanediol | 10.00 | 10.00 | 10.00 | 10.00 | 10.00 |
| | 1-(2-Hydroxyethyl)-2-pyrrolidinone | 6.00 | 6.00 | 6.00 | 6.00 | 6.00 |
| | Trimethylolpropane flakes | 2.00 | 2.00 | 2.00 | 2.00 | 2.00 |
| | POLYOL 3165 | 2.00 | 2.00 | 2.00 | 2.00 | 2.00 |
| Carrier Medium | Deionized Water | Balance | Balance | Balance | Balance | Balance |

Figure 4:
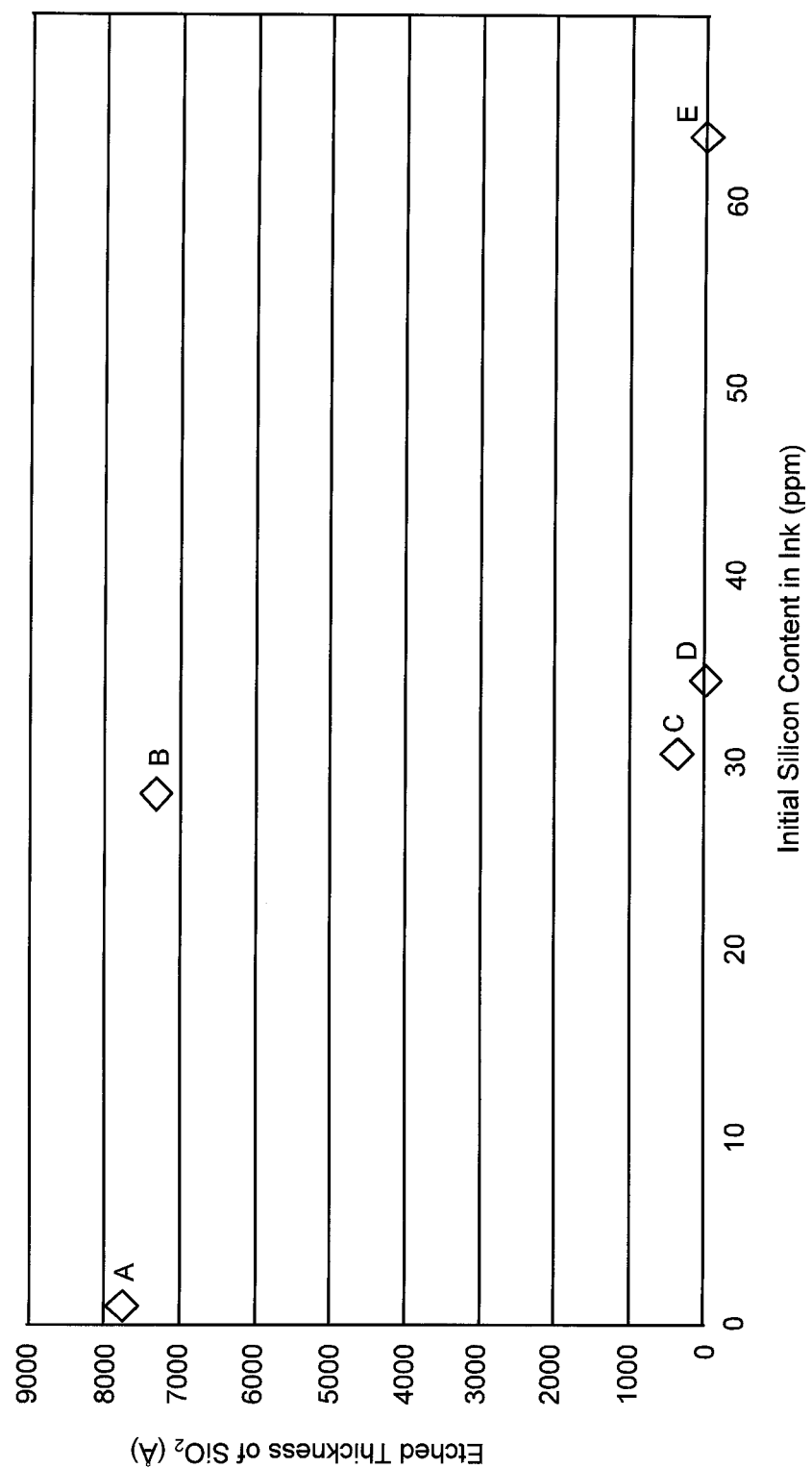
FIG. 4 is a graphical view of an etching performance of an ink composition of the present disclosure on a silicon based material.

The ink formulations listed in Table 1 may be prepared by pre-mixing the silicon doping agent with deionized water before combining with the other components of the ink composition. In an example embodiment, the silicon doping agent may be prepared into a 50% aqueous solution and added to the ink formulation at different levels of concentration. The different levels of concentration are listed in Table 1. The prepared ink formulation may then be filtered through 6 μm and 1.2 μm polypropylene filters. Referring to Table 1, Formulation A does not contain silicon doping agent and serves as the control. Formulations B, C, D and E include silicic acid as silicon doping agent at concentration of 0.05%, 0.20%, 0.50% and 2.00%, respectively, by weight of the ink composition. Corresponding silicon concentration of the Ink Formulations A, B, C, D and E are shown in FIG. 4.

Etching performance of the formulated ink compositions A through E on a silicon based material is evaluated. FIG. 4 shows the etched thickness of a silicon dioxide material being soaked in the ink formulations presented in Table 1 for a period of ten days at a temperature of about 60° C. The added silicic acid serves as the source of silicon in the ink formulations. FIG. 4 provides a good indication of the minimum silicon content required in the ink formulation to prevent etching of silicon based material Ink formulation A, having zero silicon doping agent, significantly etches the silicon dioxide material to a thickness of almost 8000 angstrom Ink formulations C, D and E having silicon concentration of at least 30 ppm prevent the etching of the silicon dioxide material. Doping the ink with silicon reduces and prevents the etching of the silicon based components of the printhead assembly. Silicon-doped inks may protect the printhead assembly from damage, thus improving printhead reliability and increasing printhead service life.

Physical properties of the ink formulations presented in Table 1 are measured before and after an aging cycle. The aging cycle includes exposing the ink formulations to a temperature of about 60° C. for a period of 2, 4, 6 and 8 weeks. Table 2 shows the measured physical properties including pH, particle size, viscosity and surface tension.

TABLE 2

| Aging Time (weeks) | Ink Formulations | pH | Particle Size (nm) | Viscosity at 25° (cps) | Surface Tension (dyne/cm) |
|---|---|---|---|---|---|
| 0 | A | 8.27 | 118 | 2.563 | 39.76 |
| | B | 8.23 | 116 | 2.563 | 39.76 |
| | C | 8.20 | 115 | 2.572 | 39.78 |
| | D | 8.14 | 120 | 2.590 | 39.74 |
| | E | 7.93 | 115 | 2.609 | 39.69 |
| 2 | A | 7.98 | 120 | 2.600 | 40.2 |
| | B | 7.99 | 120 | 2.599 | 40.2 |
| | C | 7.98 | 119 | 2.595 | 40.2 |
| | D | 7.93 | 117 | 2.610 | 40.2 |
| | E | 7.78 | 118 | 2.623 | 40.1 |

TABLE 2-continued

| Aging Time (weeks) | Ink Formulations | pH | Particle Size (nm) | Viscosity at 25° (cps) | Surface Tension (dyne/cm) |
|---|---|---|---|---|---|
| 4 | A | 7.92 | 118 | 2.587 | 40.5 |
|   | B | 7.86 | 116 | 2.602 | 40.4 |
|   | C | 7.86 | 117 | 2.583 | 40.6 |
|   | D | 7.87 | 116 | 2.583 | 40.6 |
|   | E | 7.71 | 116 | 2.629 | 40.6 |
| 6 | A | 7.89 | 117 | 2.589 | 40.5 |
|   | B | 7.90 | 116 | 2.570 | 40.5 |
|   | C | 7.90 | 116 | 2.580 | 40.5 |
|   | D | 7.86 | 115 | 2.580 | 40.4 |
|   | E | 7.78 | 115 | 2.607 | 40.3 |
| 8 | A | 7.87 | 116 | 2.581 | 41.1 |
|   | B | 7.87 | 115 | 2.576 | 41.1 |
|   | C | 7.87 | 116 | 2.581 | 41.1 |
|   | D | 7.83 | 115 | 2.585 | 41.0 |
|   | E | 7.75 | 114 | 2.618 | 41.1 |

Referring to Table 2, the addition of silicic acid to the ink formulation does not substantially change the physical properties of the ink composition. These results indicate that the addition of silicon doping agent to the ink formulation may not induce adverse chemical aging or aging phenomena to the ink composition.

Ink composition of the present disclosure may be used in any inkjet printing systems, including thermal or piezoelectric drop-on-demand printers and continuous ink jet printers. The specific ink formulations may vary depending upon the type of inkjet printing system and desired printing quality and performance.

The foregoing description of several methods and embodiments has been presented for purposes of illustration. It is not intended to be exhaustive or to limit the disclosure to the precise acts and/or forms disclosed, and obviously many modifications and variations are possible in light of the above teaching. It is intended that the scope of the invention be defined by the claims appended hereto.

What is claimed is:

1. An ink composition for reducing the etching of a printhead component comprising:
    a carrier medium;
    a colorant; and
    a silicon doping agent, wherein the silicon doping agent is silicic acid, and wherein the silicic acid comprises a type of silicic acid selected from the group consisting of: calcium salt silicic acid and aluminum salt silicic acid, and is added at an amount of at least 30 ppm-silicon and the silicon doping agent saturates the ink composition with silicon.

2. The ink composition of claim 1, wherein the carrier medium includes an aqueous based medium.

3. The ink composition of claim 1, wherein the carrier medium includes an organic solvent.

4. The ink composition of claim 1, wherein the colorant includes a pigment, a dye, or combinations thereof.

5. The ink composition of claim 1, further comprising a dispersant.

6. The ink composition of claim 1, further comprising a humectant.

7. The ink composition of claim 1, further comprising a surfactant.

8. The ink composition of claim 1, further comprising a biocide.

* * * * *